(No Model.)

T. B. MOFFAT.
BICYCLE CHIME BELL.

No. 594,750. Patented Nov. 30, 1897.

Witnesses
J. C. Shaw
Chas. E. Brock

Inventor
T. B. Moffat
By O'Meara & Co.
Attorneys

UNITED STATES PATENT OFFICE.

THEODORE B. MOFFAT, OF PITTSTON, PENNSYLVANIA.

BICYCLE CHIME-BELL.

SPECIFICATION forming part of Letters Patent No. 594,750, dated November 30, 1897.

Application filed February 3, 1897. Serial No. 621,840. (No model.)

*To all whom it may concern:*

Be it known that I, THEODORE B. MOFFAT, residing at Pittston, in the county of Luzerne and State of Pennsylvania, have invented a new and useful Bicycle Chime and Alarm Bell, of which the following is a specification.

This invention relates generally to bicycles, and more particularly to a bell for a bicycle; and the object of the invention is to provide a chime-bell or one capable of producing different tones when the bell is sounded, thereby providing an alarm-bell and at the same time one of a musical character.

With this object in view my invention consists, essentially, of a swinging frame attached to the fork of a bicycle and carrying a plurality of chime-gongs and the roller also carried by the frame and adapted to be revolved by being brought into contact with the tire of the wheel, the axle of said roller carrying tappets adapted to strike the bells and produce different-ringing tones.

The invention consists also in certain details of construction and novelties of combination, all of which will be fully described hereinafter and pointed out in the claim.

Figure 1:
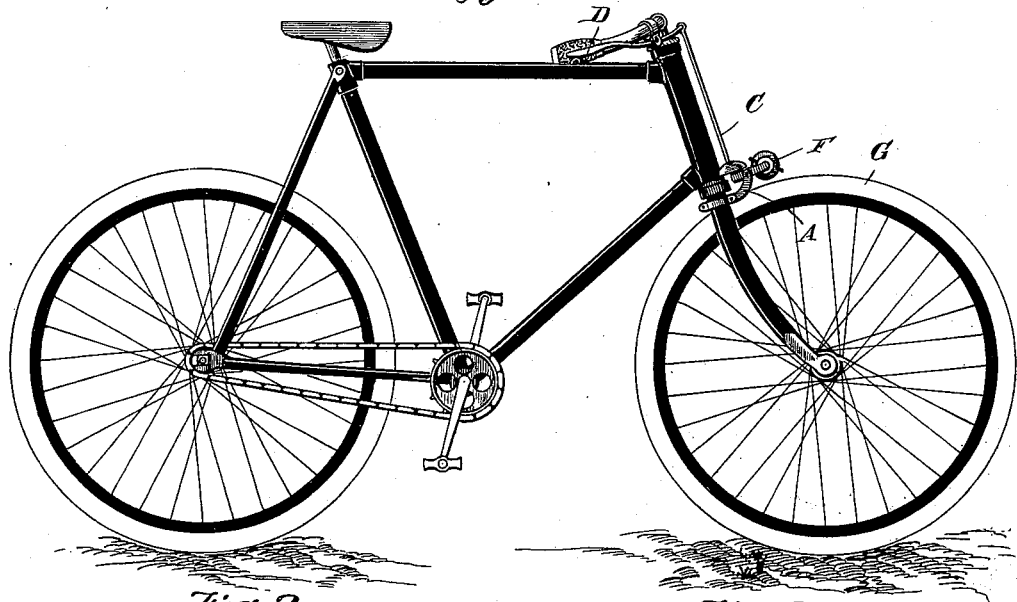
Figures 2, 3:
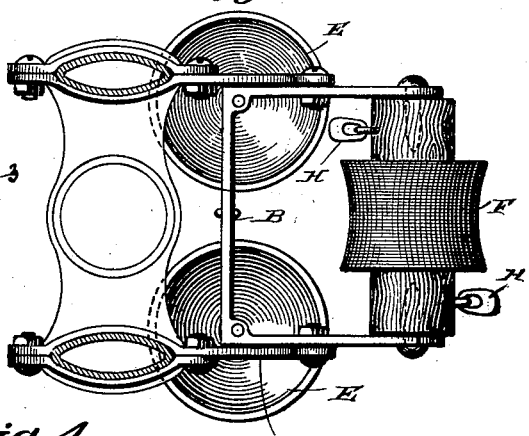
Figure 4:
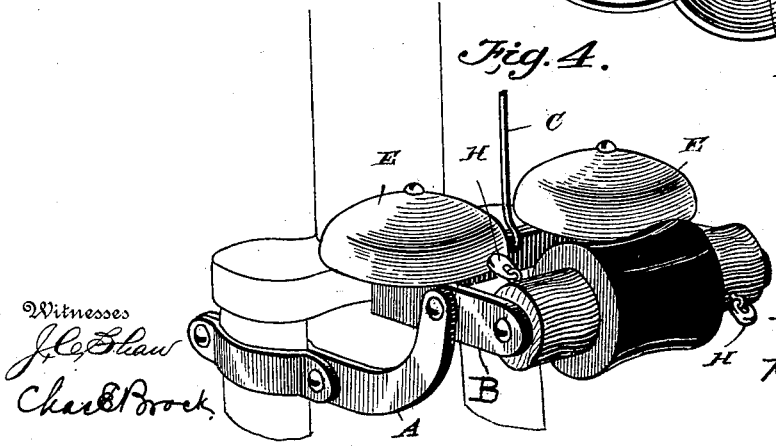

In the drawings forming a part of this specification, Figure 1 is a view of a bicycle provided with my invention. Fig. 2 is an enlarged side view of the bicycle chime-bell. Fig. 3 is a horizontal sectional view on the line 3 3 of Fig. 2, looking in the direction of the arrow. Fig. 4 is a detail perspective view of the attachment.

In carrying out my invention I employ the bracket-arms A, which are securely clipped to the front forks of the bicycle and projecting forwardly, as shown, and pivoted between the said bracket-arms is an essentially U-shaped frame B, having an operating-rod C attached to the rear side thereof, which rod is operated through the medium of the hand-lever D, pivoted upon the handle-bar of the machine, as usual.

Chime gongs or bells E are arranged upon the corners of the frame B, and within the open end of the frame is mounted a roller F, adapted to be brought into contact with the tire G of the wheel whenever the handle-lever D is operated to tilt the frame B, and swinging from the journal or shaft of the said roller F are the tappets H, which are adapted to strike the gongs or bells E as the wheel is revolved, each tappet striking its respective gong or bell once in every revolution of the roller F, and as this roller bears upon the tire of the wheel it will be seen that the strokes will follow in rapid succession, thereby producing an exceedingly musical effect.

It will be seen that I provide an exceedingly cheap, simple, and efficient combination-chime which can be readily attached to any of the bicycles now in use.

Having thus described my invention, what I claim as new, and desire to secure by Letters Patent, is—

The combination with the front fork of a bicycle, of the bracket-arms secured to the fork and projecting forwardly, a substantially U-shaped frame pivoted between said arms, chimes carried by the frame and a roller journaled in the frame, said roller being provided with the tappets for ringing the chimes, and suitable means operated by the rider for moving the roller into engagement with the front wheel, substantially as shown and described.

THEODORE B. MOFFAT.

Witnesses:
C. F. BOHAN,
J. N. ANDERSON.